C. SIEBERT & A. KÜHN.
INSTRUMENT FOR HIGH TEMPERATURES.
APPLICATION FILED DEC. 16, 1909.
1,005,339.
Patented Oct. 10, 1911.
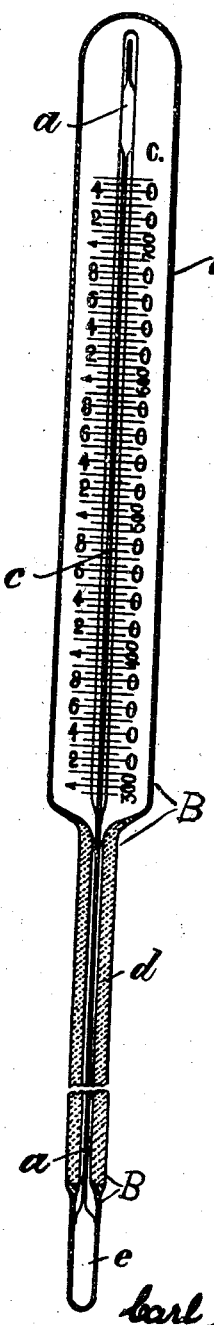

UNITED STATES PATENT OFFICE.

CARL SIEBERT AND ALBERT KÜHN, OF CASSEL, GERMANY.

INSTRUMENT FOR HIGH TEMPERATURES.

1,005,339.  Specification of Letters Patent.  Patented Oct. 10, 1911.

Application filed December 16, 1909. Serial No. 533,377.

*To all whom it may concern:*

Be it known that we, CARL SIEBERT and ALBERT KÜHN, both citizens of the Empire of Germany, residing at Cassel, in the Empire of Germany, have invented a new and useful Instrument for High Temperatures, of which the following is a specification.

Our invention relates to physical and chemical instruments for diversified purposes, which are required to withstand very high temperatures, more particularly to thermometers.

The manufacture of glass thermometers for high temperatures is rendered impossible for the reason that the best glass known commences to melt at a temperature of 575° centigrade, while thermometers made from quartz-glass are too expensive for general use, since it is most difficult to obtain transparent quartz-glass. Opaque quartz-glass is certainly comparatively cheaper, but is unfit for thermometers and similar instruments for obvious reasons.

Our invention relates to an improvement in the manufacture of instruments, more particularly thermometers, from quartz-glass, whereby the said disadvantages are avoided.

The improvement consists in making only those parts of the instrument, which require to be transparent, from transparent quartz-glass, while the other parts are made from opaque quartz-glass.

We will now proceed to describe our invention with reference to the accompanying drawing, which illustrates in a longitudinal section a thermometer embodying our invention.

In the drawing: $a$ denotes a capillary thermometer tube of any known design made from transparent quartz glass and containing mercury. This thermometer tube is adapted to be contained in a casing B, which comprises an upper portion $b$ of transparent quartz glass, a bottom portion $e$, also of transparent quartz glass and an intermediate portion $d$ of opaque quartz glass.

The bulb of the thermometer is fused in the bottom portion $e$ of the casing B, while the wide tube portion $b$ envelops the upper part of the tube $a$ and contains within it a scale $c$. The intermediate portion $d$ of the casing B is fused to the portions $b$ and $e$, thus forming a solid casing for the thermometer proper. By this arrangement it is possible to produce such thermometers, of a very great length, from quartz glass at a comparatively low price. The casing may be made up of opaque quartz glass wherever it is not necessary that the mercury in the thermometer be visible for readings.

In assembling the apparatus, the quartz glass tube $a$, adapted to receive mercury or other thermometric fluid, is first inserted in the assembled portions $b$ and $d$ of the outer casing, the upper portion of the former being left open, and the bulb of the tube $a$ fused to the lower portion $e$ of the casing B which is subsequently fused to the portion $d$. Any known process of filling the thermometer bulb and portion of the stem with a desired amount of mercury, may be used, after which the top portion of the tube $a$ is connected to a nitrogen filler apparatus. The nitrogen is then brought into the tube under a pressure of 30 atmospheres and then the upper end of the capillary tube is closed hermetically by the application of heat. The nitrogen must be placed in the tube above the mercury in order to provide the necessary pressure thereupon to retain it from the top portion of the tube in order that such portion may be closed by heat without vaporizing the mercury. When desired, that air which may have entered the tube during application of the nitrogen filler apparatus to the tube may be removed by suction. When the thermometer proper is within the casing the top may be capped by a cupola-shaped piece or by any desired capping means.

We claim:

1. A thermometer comprising a capillary thermometer tube with bulb of transparent quartz-glass, a bulb container of transparent quartz-glass fused to said bulb, a scale-tube enveloping the upper part of the capillary thermometer tube and made of transparent quartz-glass, and a tubular case of opaque quartz-glass enveloping the intermediate part of the capillary thermometer tube and fused to said bulb container and to said scale-tube.

2. A thermometer comprising a capillary thermometer tube with bulb of transparent quartz-glass, a scale tube enveloping the upper part of said capillary thermometer tube and made of transparent quartz-glass, a tubular case of opaque quartz-glass enveloping the intermediate part of said capillary thermometer tube, and a quartz-glass portion fused to and connecting said tubular case and the said bulb of said capillary thermometer tube.

CARL SIEBERT.
ALBERT KÜHN.

Witnesses:
 JULIUS SWILKES VET WITTELS,
 ADOLF HAMPE.